United States Patent [19]

Fujimura

[11] Patent Number: 4,963,008
[45] Date of Patent: Oct. 16, 1990

[54] CORRECTION LENS SYSTEM USED IN PRODUCTION OF FLUORESCENT SCREEN OF COLOR PICTURE TUBE AND METHOD OF MANUFACTURING CORRECTION LENS SYSTEM

[75] Inventor: Takeo Fujimura, Nagaokakyo, Japan

[73] Assignee: Mitsubishi Denki Kabushiki Kaisha, Tokyo, Japan

[21] Appl. No.: 387,803

[22] Filed: Aug. 1, 1989

[30] Foreign Application Priority Data

Dec. 28, 1988 [JP] Japan ................. 63-332247

[51] Int. Cl.$^5$ ............................. G02B 3/08
[52] U.S. Cl. ................................. 350/452
[58] Field of Search ................. 350/452, 432

[56] References Cited

U.S. PATENT DOCUMENTS 3,385,184  5/1968  Ramberg et al. .

FOREIGN PATENT DOCUMENTS 49-22770  6/1974  Japan .
1277041  12/1986  U.S.S.R. ............................. 350/452

*Primary Examiner*—Bruce Y. Arnold
*Assistant Examiner*—Rebecca D. Gass

[57] ABSTRACT

Disclosed are a correction lens system used in the process of producing the fluorescent screen of a color picture tube in order to reduce the positional deviation (mislanding) of the landing point of an electron beam projected to form a picture from the position of the corresponding fluorescent substance in the mosaic of the fluorescent screen, and a method of manufacturing the correction lens system. The correction lens system includes a first correction lens provided with a smooth curved surface for correcting the optical path of exposure rays for producing the fluorescent mosaic and a second correction lens provided with a discontinuous curved surface. The optical path of the exposure rays is corrected to the desired optical path by the refraction of the rays through the first and second correction lenses. The discontinuous curved surface of the second correction lens is produced by dividing a lens having a smooth curved surface into a plurality of ribbon like elements along division lines which are parallel to each other in one direction, rearranging the ribbon like elements with the respective ends reversed without changing the original arranging order between adjacent ribbon like elements, and re-bonding the ribbon like elements at the respective cut surfaces.

11 Claims, 2 Drawing Sheets

CORRECTION LENS SYSTEM USED IN PRODUCTION OF FLUORESCENT SCREEN OF COLOR PICTURE TUBE AND METHOD OF MANUFACTURING CORRECTION LENS SYSTEM

BACKGROUND OF THE INVENTION

The present invention relates to a correction lens system used in the process of producing the fluorescent screen of a color picture tube and a method of manufacturing such a correction lens system.

DESCRIPTION OF THE PRIOR ART

A great problem in the production of a color picture tube is how to reduce the positional deviation (hereinunder referred to as "mislanding") of the landing point of an electron beam projected to compose a picture which has been formed on the inner surface of a color picture tube panel by light irradiation so as to constitute a mosaic.

To solve this problem, a correction lens having a specific shape is placed in the optical path of the expose rays for printing a fluorescent mosaic by photography for correcting the optical path of the rays. This method is described in detail on pages 491 to 497 of RCA REVIEW, Vol. 16 (1955) by D.W. Epstein and others under the title of "Improvement in Color Kinescope through Optical Analogy".

As a correction lens, a lens in the shape of complicated concave and convex, and having a smooth curved surface, is generally used. It is, however, also known that in the case in which a fluorescent screen on the inner surface of the color picture tube panel is a mosaic of fluorescent dots, if the surface of the correction lens is restricted to a smooth curved surface, it is impossible to completely correct the mislanding over the entire surface of the color picture tube panel. This fact is based on the fundamental principle of optics. So long as the surface of the correction lens is restricted to a smooth curved surface, the above problem cannot be solved simply by varying the position of the lens or the combination of a plurality of lenses.

As a countermeasure, a method of using a lens which is divided into a plurality of blocks and reconstructed in such a manner that a discontinuous and stepped surface is produced on the respective division lines has been proposed. According to this method, the lens surface is divided into one hundred to several hundred small blocks. Since the respective block lenses may not necessarily have curved surfaces, a lens having an inclined flat surface is available for each block lens. Since the discontinuous portions on the division lines of this lens cause nonuniformity of illuminance, this lens is required to be constantly reciprocated at a small amplitude during use in order to reduce the nonuniformity of illuminance. This technique is described in detail on pages 149 to 150 of Journal of SMPTE March 1973 Vol. 82 (Society of Motion Picture and Television Engineers) by Yamazaki and others under the title of "A Segmented Lens for Improving Color Television Dot Patterns".

Since the conventional lens having a discontinuous curved surface consists of more than 100 block lenses, it is very difficult to produce. To solve this problem, a method of producing a lens from a plastic material by pressing an appropriate die against the plastic material at a high temperature has been proposed. This method, however, is disadvantageous in that, since it is difficult to clean the surface of such a plastic lens in a stainless state, a lens having even a slight stain must be discarded.

In addition, since the division lines extend in two directions orthogonal to each other in the conventional lens having a discontinuous curved surface, the lens is required to be reciprocated in the two directions during use in order to eliminate the deleterious influence of the discontinuous portions existing on the division lines, thereby complicating the reciprocating apparatus.

Furthermore, since exposure rays generally cause anomalous refraction on the division lines, it is necessary to provide a black shading zone over a constant width on the exposure ray incident side. In other words, if the number of division lines is large, the exposure ray utilization efficiency is lowered. This is reckoned among the causes for introducing the reduction of the production efficiency of a color picture tube.

SUMMARY OF THE INVENTION

Accordingly, it is an object of the present invention to eliminate the above-described problems in the prior art and to provide a correction lens system used in the process of producing the fluorescent screen of a color picture tube, the correction lens system capable of realizing the correction of a deviation which cannot be realized by any combination of lens having smooth curved surfaces solely, being manufactured from glass, which is easy to clean during use, by substantially the same method as a method of producing a lens having a smooth curved surface, and having a higher exposure ray utilization efficiency than a conventional lens having a discontinuous curved surface; and a method of manufacturing such a correction lens system.

To achieve this aim, a correction lens system according to the present invention comprises a combination of at least one first correction lens having a smooth curved surface and at least one second correction lens having a discontinuous curved surface consisting of discontinuous portions which are parallel to each other in one direction, and reduces the amount of mislanding by the synthetic characteristics of the first and second correction lenses. The second correction lens having a discontinuous curved surface is produced by forming a smooth curved surface on one sheet of optical material such as glass, cutting the smooth curved surface into a plurality of ribbon like elements along a plurality of division lines which are parallel to each other, and arranging the ribbon like elements with the respective ends reversed without changing the original arranging order.

According to a correction lens system having the above-described structure, a mislanding component which can be corrected by a correction lens having a smooth curved surface is corrected by the first correction lens having a smooth curved surface as in the prior art, and a mislanding component which cannot be corrected by a correction lens having a smooth curved surface is corrected by the synthetic characteristics of the first correction lens having a smooth curved surface and the second correction lens having a discontinuous curved surface.

If a component which cannot be corrected by a correction lens having a smooth curved surface is divided into two components which are orthogonal to each other, it is generally possible to completely correct either of the components. However, this correction produces an additional correction component on the other component, thereby generally deteriorating the degree of correction of this component. Even the use of only the second correction lens having a discontinuous curved surface in accordance with the present invention cannot correct the component which cannot be corrected by a conventional lens having a smooth curved surface. In the same way as in the case of using the lens having a smooth curved surface, if the component is divided into two components which are orthogonal to each other, it impossible to substantially completely correct either of the components. This correction also produces an additional correction component, on the other component as in the case of using a lens having a smooth curved surface. The direction of the additional correction component produced by the correction through the lens having a smooth curved surface and the direction of the additional correction component produced by the correction through the second lens having a discontinuous curved surface are substantially opposite and the magnitudes thereof are substantially the same. Therefore, substantially complete correction is enabled by a combination of the first correction lens having a smooth curved surface and the second correction lens having a discontinuous curved surface.

It is easy to produce the second correction lens having a discontinuous curved surface from glass by using the prior-art polishing method and it is also easy to remove dust, stain or the like from the lens surface during use without producing a flaw on the lens surface.

In addition, since the division lines for the ribbon like elements are in parallel to each other in one direction on one lens surface, the reciprocation motion only in one direction is enough for preventing the nonuniformity of illuminance caused by the discontinuous portions on the division lines during the exposure on the fluorescent screen of a color picture tube. This thereby comparatively simplifies the structure of the exposure apparatus. Thus, it is possible to produce a high-quality color picture tube at a low cost.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
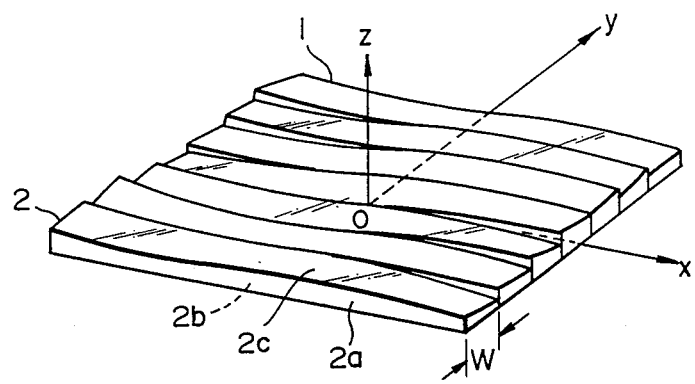
FIG. 1 is a perspective view of a second correction lens having a discontinuous curved surface in an embodiment of a correction lens system according to the present invention.

Embodiments of a correction lens system used in the process of producing the fluorescent screen of a color picture tube according to the present invention will be explained with reference to the accompanying drawings. FIG. 1 shows a second correction lens having a discontinuous curved surface, which is the main part of the present invention. A second correction lens 1 having a discontinuous curved surface is composed of an aggregate of a plurality of ribbon like elements 2 consisting of glass. Each of the ribbon like elements 2 has the same width W and the thickness thereof is sufficiently smaller than the width W. Each ribbon like element 2 has two side surfaces (hereinunder referred to as "cut surfaces") 2a which are parallel to each other with a space W therebetween. One of the other surfaces of the ribbon like element 2 is a surface perpendicular to the cut surfaces 2a. This surface will be referred to as a flat surface side 2b hereinunder. The plurality of ribbon like elements 2 are arranged into a rectangular shape such that the flat surface sides 2b thereof are aligned in the same plane without any space between the cut surfaces 2a of the adjacent ribbon like elements 2. (As will be described later, an appropriated holding frame or the like is necessary for keeping the above-described arrangement in practical use, but explanation thereof is omitted in this drawing.) The surface of the ribbon like element 2 which is opposite to the flat surface side 2b has a smooth curved surface, and this surface will be called a curved surface side 2c hereinunder.

For the sake of convenience of the following explanation, it is assumed that the center of the flat surface side of the second correction lens 1 having a discontinuous curved surface is the origin O, and that in the plane containing the flat surface side 2b of each ribbon like element 2, the x-axis is set in the longitudinal direction of the ribbon like element 2, the y-axis is set perpendicularly to the y-axis and the z-axis is set perpendicularly to the xy-plane with the direction toward the curved surface side 2c of the ribbon like element 2 as plus.

Figure 2:
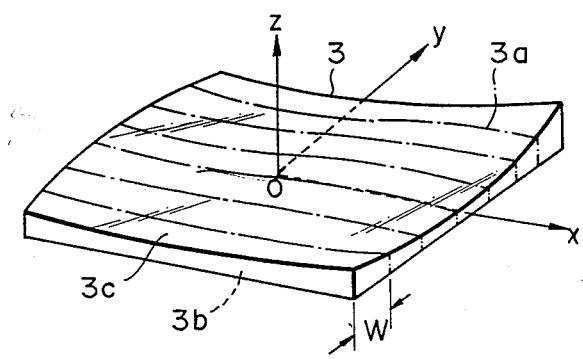
FIG. 2 is a perspective view of an original lens for producing the second correction lens shown in FIG. 1.

A method of manufacturing the second correction lens 1 having a discontinuous curved surface shown in FIG. 1 will now be explained. FIG. 2 shows an original form of the second correction lens 1 having a discontinuous curved surface shown in FIG. 1, and this original form will be referred to as an original lens 3 hereinunder.

The original lens 3 is made of a sheet of a glass material and has the same rectangular plane shape as that of the second correction lens 1 having a discontinuous curved surface shown in FIG. 1. One surface 3b is a flat surface (hereinunder referred to as "flat surface side") and the other surface 3c opposite thereto is a smooth curved surface (hereinunder referred to as "curved surface side") over the entire part of the original lens 3. The method of defining the curved surface will be described later. Since the surface is smooth, it is possible to form the curved surface side 3c of the original lens by the ordinary curved surface polishing method.

Figure 3A:
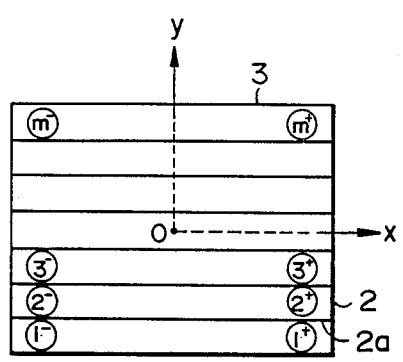
FIG. 3 shows the process of producing the second correction lens shown in FIG. 1 from the original lens shown in FIG. 2.

The original lens 3 is cut at a plurality of division lines each of which is parallel to the x-axis and perpendicular to the xy-plane at regular intervals of W. In FIG. 2, the one-dot chain represents the cut surface 3a. The original lens 3 after the completion of cutting is shown in FIG. 3(A). The ribbon like elements 2 are thus formed by being defined by the cut surfaces 3a.

For the sake of convenience of explanation, numerals (1), (2), (3) . . . (m) are provided for the respective ribbon like elements 2. The ribbon like element 2 situated at the (−) minus end of the y-axis is provided with the numeral (1), and the subsequent ribbon like elements are serially provided with (2), (3) . . . . The plus (+) end of the x-axis of each ribbon like element 2 is provided with the symbol (+), while the minus end of the x-axis thereof is provided with the symbol (−). FIG. 3(A) shows the ribbon like elements 2 with both ends thereof provided with combinations of the symbols (1+), (1−), (2+), (2−) . . . (m+), (m−), respectively.

The arrangements of these ribbon like elements 2 are then changed in accordance with the following rules:

(I) The relationship between the numerical orders (1), (2), (3) . . . and the y-axis is not changed.

(II) The relationship between the top side and the back side with respective to the xy-plane is not changed.

(III) The directions of (+) and (−) with respect to the x-axis are reversed.

Figure 3B:
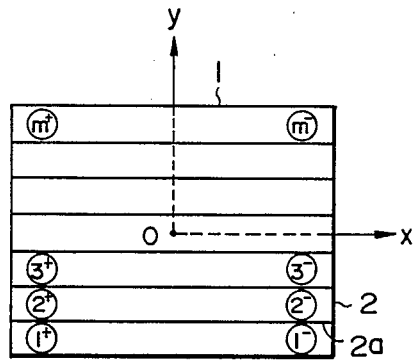

The result of the rearrangement is shown in FIG. 3(B). Thus, the second correction lens 1 having a discontinuous curved surface shown in FIG. 1 is obtained. The cut surfaces 3a of the original lens 3 constitute the cut surfaces 2a of the second correction lens 1.

Figure 4:
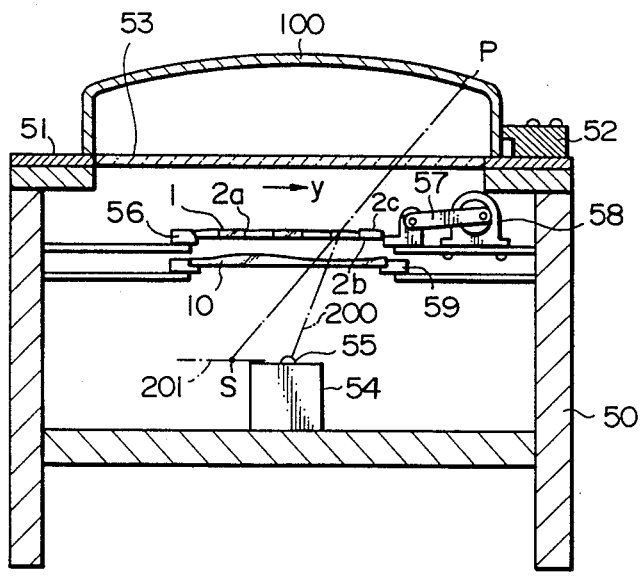
FIG. 4 is an elevational view of an exposure apparatus using a first correction lens having a smooth curved surface and a second correction lens having a discontinuous curved surface in accordance with the present invention for producing the fluorescent screen of a color picture tube.

The fluorescent screen of a color picture tube is produced (the mosaic of fluorescent substances is printed) by an exposure apparatus shown in FIG. 4 which uses the thus-obtained second correction lens 1 having a discontinuous curved surface. In FIG. 4, the reference numeral 50 represents the support of an exposure apparatus. To the upper plate 51 a positioning claw 52 is attached and a panel 100 of a color picture tube is placed at a predetermined position regulated by the positioning claw 52. A photosensitive emulsion is applied to the inner surface of the panel 100. Further a shadow mask (not shown) is mounted on the inner surface of the panel. The upper plate 51 has a window 53. At a predetermined position of the support 50, a lamphouse 54 is fixed. The near-ultraviolet rays for exposure which have been produced in the lamphouse 54 collectively diverge from bundle of rays diverging portion 55 toward the panel 100. Since the bundle of rays diverging portion 55 can be regarded as substantially the light source of the near-ultraviolet rays, it will be referred to as the "point source 55" hereinunder. In the optical path on which the near-ultraviolet rays (hereinunder referred to merely as "rays") diverged from the point source 55 direct toward the panel 100, at least one pair of a first correction lens 10 having a smooth curved surface and the second correction lens 1 having a discontinuous curved surface shown in FIG. 1 are provided for correcting the optical path of the rays. The first correction lens 10 is a lens having a smooth curved surface and the optical path correction characteristic which will be described later. The second correction lens 1 having a discontinuous curved surface is a lens composed of an aggregate of the ribbon like elements 2, as explained with reference to FIG. 1.

The second correction lens 1 having a discontinuous curved surface is designed so as to constantly reciprocate at an appropriate amplitude in the direction of y (y-axis defined in FIG. 1) by a frame 56, a link 57 connected thereto, and a driving device 58. (In order to move the second correction lens 1 only in the direction of y, an appropriate sliding mechanism is necessary between the frame 56 and the support 50, but it is omitted in FIG. 4.) The first correction lens 1 having a smooth curved surface is secured to the support 50 by the frame 59. It is in order to prevent the non-uniform illuminance due to the irregular reflection of the rays from the point source 55 on the cut surfaces 2a that the second correction lens 1 is constantly reciprocated in the direction of y.

The ray 200 starting from the point source 55 refracts when passing through the first correction lens 10 and the second correction lens 1, and thereafter enters the point P on the panel 100. It is now assumed that the point at which the incident ray linearly extended in the opposite direction to P intersects an imaginary plane 201 which is on the same level with the point source 55 (in other words, which is flush with the point source 55 and parallel to the upper plate 51) is S. The point S will be referred to as an imaginary point source hereinunder. When any given point P is set on the panel 100 and the ideal position of the imaginary point source S is set in correspondence with the point P, if the ray is refracted such that the actual point source S agrees with the ideal position, mislanding in the color picture tube is prevented. However, in a conventional system, which only uses a combination of lenses having smooth curved surfaces, it is difficult to satisfy these conditions with respect to all points on the panel.

The feature of the present invention lies in that the above-described difficulty in correction is substantially solved by using the second correction lens 1 having a discontinuous curved surface together with the first correction lens having a smooth curved surface 10. The reason why the above-described problem is solved by the use of a combination of the first and second correction lenses 10 and 1, and the outline of the method of designing the respective lenses 10 and 1 will be described in the following.

When any given point P is set on the panel 100, if the imaginary point source S corresponding to the point P deviates from the ideal position on the imaginary plane 201, mislanding is caused on the point P. The deviation of the imaginary point source S from the ideal point will therefore be called "mislanding at the point P" hereinunder. Mislanding is composed of an x component and a y component. (x and y represent the respective directions already defined.)

In the mislanding distributing over the entire effective surface of the panel 100, at least either of the x components or the y components can be corrected by the known correction lens having a smooth curved surface. In FIG. 4, it will now be assumed that the second correction lens 1 having a discontinuous curved surface is not disposed and all the y components of mislanding are corrected by the first correction lens 10. At this time, the remaining mislanding component in the direction of x is represented by the function of the position on the panel 100 as $\Delta x\ (X, Y)$. $(X, Y)$ is coordinates of the point P on a coordinate system appropriately determined on the panel 100.

On the other hand, it is also possible to correct all the x components of mislanding by the first correction lens 10 having a smooth curved surface. At this time, the remaining mislanding component in the direction of y is represented by $\Delta y\ (X, Y)$.

It is proved from a formula of geometrical optics that the amount and the direction of distribution of the remaining mislanding components $\Delta x\ (X, Y)$ and $\Delta y\ (X, Y)$ which are obtained by the two respective processes described above have no relation to the position of the first correction lens 10 having a smooth curved surface and further that this state cannot be changed even by increasing the number of the first correction lenses 10. That is, that an uncorrected mislanding component remaining as $\Delta x$ or $\Delta y$ is inevitable so long as using a lens having a smooth curved surface, and it is impossible to remove both mislanding components simultaneously by a correction lens having a smooth curved surface.

However, it is possible to correct mislanding by the first correction lens 1 having a smooth curved surface such that halves of the respective uncorrected components are corrected and the other halves are left uncorrected. In other words, the uncorrected components ½ Δx (X, Y) and ½ Δy (X, Y) are simultaneously generated in the directions of x and y, respectively. The first correction lens 10 having a smooth curved surface is designed in such a manner.

The second correction lens 1 is then added to the system. To simplify the explanation, it is assumed that the second correction lens 1 is made of a sufficiently thin material. This is because if the second correction lens 1 is thick, the optical path is changed by the thickness of the material itself even if no curved part or inclination is provided on the surface, and the position of S moves, thereby complicating the process of designing the lens. However, since new mislanding caused by the movement of the position of S can be completely removed geo-optically, if necessary, by the modification of the design of the first correction lens 10, that the thickness of the second correction lens is sufficiently small is not an essential condition for the configuration of the second correction lens.

If it is assumed that a lens having a smooth curved surface is added at the position of the second correction lens 1 so as to correct the uncorrected component ½ Δx (X, Y), the uncorrected component in the direction of y is increased by ½ Δy (X, Y). Thus state is realized in which the mislanding in the direction of x has been completely corrected and the uncorrected mislanding component in the direction of y is Δy (X, Y), as described above with respect to the correction only by the first correction lens 10. However, such a lens having a smooth curved surface is to be designed purposely (the lens is assumed to be at the position of the second correction lens 1 in FIG. 4, as described above).

This lens will be called an imaginary lens hereinunder and is assumed to have a flat undersurface (on the side of the light source) and a curved upper surface (on the side of the panel). It is also assumed that the center of the undersurface is the origin O and the curved surface is represented by the function z=f (x, y).

A lens having a curved surface represented by z=f (−x, y) is devised and produced from an appropriate optical material such as glass. This lens is the original lens 3 shown in FIG. 2. As is clear from the above explanation, the curved surface of the original lens 3 is smooth.

The original lens 3 is cut at a multiplicity of division lines, as described with reference to FIG. 3. The thus-obtained ribbon like elements are then rearranged in accordance with the above-described rules so as to produce the second correction lens 1.

The characteristic of a correction lens used for correcting mislanding is generally influenced by the thickness of the lens at each point at which the ray passes, and the inclination of the curved surface of the lens at that point.

The inclination in the direction of x is equal to the tangent of the angle between the normal of the surface and the yz-plane and the inclination in the direction of y is equal to the tangent of the angle between the normal of the surface and the xz-plane.

However, if the incident angle of the ray is small (which corresponds to the condition that the angle of deflection is small in the color picture tube), the influence of the thickness is negligible, and the correction characteristic is influenced by the inclinations in the directions of x and y at each point on the lens surface. In addition, the mislanding component in the direction of x is dominantly corrected by the inclination of the direction of x of the lens surface, while the mislanding component in the direction of y is dominantly corrected by the inclination of the direction of y of the lens surface. If these conditions are satisfied, the inclinations in the directions of x and y at each point of the curved surface represented by z=f (x, y) of the designed imaginary lens are represented by $\delta f/\delta x$ and $\delta f/\delta y$, respectively.

This imaginary lens can reduce the mislanding in the direction of x by ½ Δx (X, Y) but increases the mislanding in the direction of y by ½ Δy (X, Y), as is clear from the designing process. That is, the imaginary lens having a curved surface represented by z=f (x, y) reduces the mislanding in the direction of x by ½ Δx (X, Y) but increases the mislanding in the direction of y by ½ Δy (X, Y) at the point (x, y) having the inclination of $\delta f/\delta x$ in the direction of x and $\delta f/\delta y$ in the direction of y.

In contrast, as described above, the second correction lens 1 in accordance with the present invention is produced by cutting the original lens 3 having a curved surface represented by z=f (−x, y) and rearranging the ribbon like elements as shown in FIG. 3. If the width W of the ribbon like element 2 is sufficiently small, the inclination in the direction of x at the point (x, y) is substantially $\delta f(x, y)/\delta x$, and the inclination in the direction of y at the point (x, y) is substantially $-\delta f(x, y)/\delta y$. When the correction characteristic of the second correction lens 1 is compared with those of the imaginary lens, the correction characteristic in the direction of x is the same but in the correction in the direction of y, the second correction lens 1 reduces the mislanding by ½ Δy (X, Y) at the point (x, y) having the inclination of $-\delta f/\delta y$ in the direction of y.

In other words, the second correction lens 1 in accordance with the present invention can simultaneously realize the correction of ½ Δx (X, Y) in the direction of x and the correction of ½ Δy (X, Y) in the direction of y. In the exposure apparatus shown in FIG. 4, the first correction lens 1 having a smooth curved surface leaves the uncorrected mislanding component of ½ Δx (X, Y) in the direction of x and the uncorrected mislanding component of ½ Δy (X, Y) in the direction of y. Accordingly, by the use of a combination of the first correction lens 10 having a smooth curved surface and the second correction lens 1 having a discontinuous curved surface, all the mislanding components are corrected.

In the above explanation, some approximations are included and the space between the cut surfaces 2a cannot be reduced excessively in the actual second correction lens 1. Therefore, the correction lens system according to the present invention cannot completely eliminate the mislanding components left uncorrected by a conventional lens having a smooth curved surface. However, the correction lens system of the present invention has a great practical effect and can eliminate most of the mislanding components which conventionally matter as the uncorrected components.

The method of manufacturing a lens having a discontinuous curved surface is characterized by the steps of cutting a curved surface after formation into a multiplicity of ribbon like elements and rearranging the ribbon like elements. The method of designing the lens surface is not restricted to the method in this embodiment. In this embodiment, the first correction lens 10 having a smooth curved surface corrects mislanding while leaving the uncorrected mislanding components ½ Δx (X, Y) and ½ Δy (X, Y), and these uncorrected mislanding components are corrected by the second correction lens 1 having a discontinuous curved surface. However, the assignment of correction task to the first and second correction lenses is not restricted thereto so long as the mislanding components remaining uncorrected by the first correction lens 10 having a smooth curved surface is corrected by the second correction lens 1 having a discontinuous curved surface and thus the optimum synthetic correction characteristics are obtained.

In the embodiment shown in FIG. 4, one lens having a smooth curved surface and one lens having a discontinuous curved surface are used, but the number of lenses are not restricted thereto. Further, a plurality of either or both of lenses having smooth curved surfaces and lenses having discontinuous curved surfaces may be used. In this case, although the cut surfaces 2a of each lens having a discontinuous curved surface must be parallel to each other in one direction in the corresponding lens, but the direction in which the cut surfaces 2a are parallel to each other need not necessarily be the same in all the lenses, but may be different in lenses. In this case, the direction of reciprocation of the lens is determined for each lens. In addition, the material of a lens is not restricted to glass.

In the embodiment shown in FIG. 4, the second correction lens 1 is so disposed that the curved surface side 2c is farther from the point source 55 than the flat surface side 2b, but it may be disposed upside down. In this case, the second correction lens 1 may be produced in the same way as shown in FIG. 3 (FIG. 3 shows the second correction lens 1 as seen from the opposite side of the point source 55), and the thus-produced lens is disposed upside down. Alternatively, in the process of rearranging the ribbon like elements 2, the top surface and the back surface may be reversed in each ribbon like element 2 ((+) and (−) are not reversed). All of these methods are based on the principle of the present invention. It goes without saying that the original lens 3 is designed by an appropriate method in each case.

In a thin lens, whether the smooth curving is on the top surface or on the back surface does not relate to the effect of reducing the amount of mislanding.

In the above-described case, therefore, the configuration of original lens surface before rearranging ribbon like elements 2 can be represented by the function Z=f(x, y) same as being obtained by said design process.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A correction lens system disposed between an exposure light source and a color picture tube panel subjected to exposure treatment for reducing the amount of mislanding by correcting the optical path of exposure rays in the process of producing the fluorescent screen of a color picture tube, said correction lens system comprising:

at least one first correction lens provided with a smooth curved surface portion for refracting exposure rays projected from said light source so as to correct said mislanding; and at least one second correction lens provided with a discontinuous curved surface portion composed of a plurality of ribbon like elements each of which is provided with a smooth curved portion having a predetermined inclination at each point of said surface and the boundaries of which constitute discontinuous portions parallel to each other in one direction for refracting said exposure rays which have been refracted by said first correction lens so as to correct the mislanding component which remains uncorrected by said first correction lens.

2. A correction lens system according to claim 1, wherein said first correction lens is also provided with a flat surface portion on the surface opposite to said smooth curved surface portion.

3. A correction lens system according to claim 1, wherein said second correction lens is also provided with a flat surface portion on the surface opposite to said discontinuous curved surface portion.

4. A correction lens system according to claim 1, wherein said first correction lens and said second correction lens have a rectangular plane shape.

5. A correction lens system according to claim 1, wherein said first correction lens and said second correction lens are made of glass.

6. A correction lens system according to claim 1, wherein said first correction lens and said second correction lens are disposed in parallel to each other with a predetermined space therebetween.

7. A correction lens system according to claim 1, wherein said curved surface portions of said first correction lens and said second correction lens constitute the planes of refraction of said exposure rays.

8. A correction lens system according to claim 1, wherein said curved surface portion of said first correction lens constitutes the plane of refraction of said exposure rays and said curved portion of said second correction lens constitutes the plane of incidence of said exposure rays.

9. A correction lens system according to claim 1,
wherein said first correction lens is fixed at a predetermined position by a fixed frame, and
said second correction lens is supported by a holding frame and said holding frame is reciprocated in the direction perpendicular to said discontinuous portions of said second correction lens by a driving device and a link.

10. A method of manufacturing a correction lens having a discontinuous curved surface which is used in a correction lens system and is disposed between an exposure light source and a color picture tube panel and is subjected to exposure treatment for reducing the amount of mislanding to a desired amount by correcting the optical path of exposure rays to a desired optical path, and used in the process of producing the fluorescent screen of a color picture tube, said method comprising the steps of:

designing a correction lens provided with a smooth curved surface for reducing either of the mislanding components, in two directions which are orthogonal to each other, substantially to zero;

producing an original lens by mirroring said correction lens around the axis in the direction orthogonal to the direction in which the mislanding component is reduced to substantially zero;

dividing said produced original lens into a plurality of ribbon like elements along division lines forming cut side surfaces which are parallel to each other in a first direction;

rearranging said ribbon like elements by reversing respective ends of said ribbon-like elements which are perpendicular to said parallel-first direction, without changing the original arranging order between adjacent ribbon like elements; and re-bonding said rearranged ribbon like elements at the respective cut side surfaces so as to form said correction lens having a discontinuous curved surface.

11. A method of manufacturing a correction lens having a discontinuous, curved top surface which is used in a correction lens system and is disposed between an exposure light source and a color picture tube panel and is subjected to exposure treatment for reducing the amount of mislanding to a desired amount by correcting the optical path of exposure rays to a desired optical path, and used in the process of producing the fluorescent screen of a color picture tube, said method comprising the steps of:

designing a correction lens provided with a smooth bottom surface and a smooth curved top surface for reducing either of the mislanding components, in two directions which are orthogonal to each other, substantially to zero;

dividing said designed correction lens into a plurality of ribbon like elements of a smooth curved top surface and a smooth bottom surface along division lines forming cut side surfaces which are parallel to each other in a first direction;

rearranging said ribbon like elements by reversing the smooth curved top surface and the smooth bottom surface of each ribbon like element without changing the original arranging order between adjacent ribbon like elements; and re-bonding said rearranged ribbon like elements at the respective cut side surfaces so as to form said correction lens having a discontinued curved top surface.

* * * * *